(12) United States Patent
Zhang et al.

(10) Patent No.: US 11,518,623 B2
(45) Date of Patent: Dec. 6, 2022

(54) ANTI-SKID SPEED MEASUREMENT AND MATERIAL FLOW DETECTION DEVICE FOR BELT CONVEYOR

(71) Applicant: HUANENG POWER INTERNATIONAL, INC. SHANGHAI SHIDONGKOU FIRST POWER PLANT, Shanghai (CN)

(72) Inventors: Xiao Zhang, Shanghai (CN); Jinxin Yu, Shanghai (CN); Huijuan Shi, Shanghai (CN); Hongbin Li, Shanghai (CN)

( * ) Notice: Subject to any disclaimer, the term of this patent is extended or adjusted under 35 U.S.C. 154(b) by 0 days.

(21) Appl. No.: 17/447,442

(22) Filed: Sep. 12, 2021

(65) Prior Publication Data

US 2022/0234838 A1    Jul. 28, 2022

(30) Foreign Application Priority Data

Jan. 22, 2021    (CN) .......................... 202110090096.5

(51) Int. Cl.

| | | |
|---|---|---|
| *B65G 43/04* | (2006.01) | |
| *B65G 23/04* | (2006.01) | |
| *B65G 39/02* | (2006.01) | |
| *B65G 39/12* | (2006.01) | |
| *B65G 15/08* | (2006.01) | |
| *B65G 15/60* | (2006.01) | |
| *B65G 15/40* | (2006.01) | |

(52) U.S. Cl.
CPC ............. *B65G 43/04* (2013.01); *B65G 23/04* (2013.01); *B65G 39/02* (2013.01); *B65G 2203/025* (2013.01); *B65G 2203/0291* (2013.01); *B65G 2203/042* (2013.01)

(58) Field of Classification Search
None
See application file for complete search history.

(56) References Cited

U.S. PATENT DOCUMENTS

| | | | | |
|---|---|---|---|---|
| 1,780,954 A | * | 11/1930 | Tomkins ................ | B65G 15/46 100/151 |
| 1,825,119 A | * | 9/1931 | Mug ..................... | B21B 39/008 310/67 R |
| 2,818,966 A | * | 1/1958 | Gill ...................... | B65G 39/125 198/826 |

(Continued)

FOREIGN PATENT DOCUMENTS

KR        20090078573 A  *  7/2009

*Primary Examiner* — Kavel Singh

(57) ABSTRACT

The present invention relates to an anti-skid speed measurement and material flow detection device for a belt conveyor, include a base symmetrically arranged on the intermediate frame of the belt conveyor and arranged between two groups of slotted roller supports, sliding supports arranged on the base, a speed measurement roller and a sensor arranged on the two groups of sliding supports, and a control system connected with the sensor, a speed measurement disk is sleeved on an end face of one end of a barrel of the speed measurement roller, a circular hole is formed on the circumference of the speed measurement disk, the circular hole is arranged corresponding to the position of the senso. Compared with the prior art, the present invention has the advantages of dramatically reduced production cost and maintenance cost, simple structure and high reliability.

10 Claims, 4 Drawing Sheets

(56) References Cited

U.S. PATENT DOCUMENTS

| | | | | |
|---|---|---|---|---|
| 4,475,648 A * | 10/1984 | Weeks | ................... | B65G 39/12 |
| | | | | 198/860.1 |
| 5,341,920 A * | 8/1994 | Riffe | ...................... | B65G 39/12 |
| | | | | 198/840 |
| 5,918,728 A * | 7/1999 | Syverson | ............... | B65G 23/08 |
| | | | | 198/784 |
| 8,558,541 B2 * | 10/2013 | Furukawa | ............... | B65G 43/02 |
| | | | | 324/207.16 |
| 9,352,911 B2 * | 5/2016 | Hearn | ................... | B65G 43/00 |
| 10,118,765 B2 * | 11/2018 | Ragan | .................... | B65G 15/60 |

* cited by examiner

ANTI-SKID SPEED MEASUREMENT AND MATERIAL FLOW DETECTION DEVICE FOR BELT CONVEYOR

CROSS-REFERENCE TO RELATED APPLICATIONS

This application claims priority benefits to Chinese Patent Application No. 202110090096.5, filed on Jan. 22, 2021. The contents of the aforementioned application are incorporated herein by reference.

Technical Field

The present invention relates to the technical field of belt conveyors, in particular to an anti-skid speed measurement and material flow detection device for a belt conveyor.

Background Art

A belt conveyor is common equipment for material conveying, and carries and conveys materials to a specified location through a running conveyor belt. However, a conveyor belt speed measurement device needs to be mounted on the conveyor to detect whether the conveyor belt runs according to the designed speed, if the conveyor belt runs at an abnormal speed which is usually less than the specified speed, it means that the belt conveyor is in an abnormal state, for example, breakage or slipping of the conveyor belt occurs, when the drive device is abnormal, the drive force cannot be transferred to the drive roller to drive the conveyor belt to run, therefore, the anti-skid speed measurement device for a belt conveyor is a very important protection device.

As to the existing anti-skid speed measurement device for a belt conveyor, a special roller is in contact with a return belt conveyor of a conveyor, to detect the running of the conveyor belt, or a detection device is mounted on the side surface of the redirecting roller of the belt conveyor. These methods have the following obvious shortcomings: as to the method of detecting the return belt, the detection device is often inaccurate and may report incorrectly due to the existence of foreign materials or materials on the return belt; in addition, the diameter may become smaller when the roller is abraded, such that the measured value becomes big and needs to be constantly adjusted manually. While as to the method of measuring the side surface of the redirecting roller, due to the accumulation of on-site materials, the detection device may be often influenced and interfered, and the measurement device may be easily destroyed, and the rotating device needs to be often maintained and lubricated.

When the conveyor belt starts to run, no material is available on the conveyor belt, when the material falls onto the conveyor belt, the conveyor belt will transport the material to the designated place, at this time, whether the material exists on the conveyor belt needs to be detected, that is, whether the conveyor belt is in an unloaded state or in a heavily-loaded state, in addition, a multi-stage conveyor can also reflect which conveyor the material has reached, that is, the belt conveyor is equipped with a special material flow detection device. The commonly used material flow detection devices are arranged directly above the bearing belt and detect the material through a detection rod. When material appears on the conveyor belt, the stacked materials will touch the detection rod, causing the detection rod to rotate, thereby generating a material flow signal. In another method, the conveyor belt is detected to sink under a heavy load and touch the special roller to drive the roller to rotate, thereby generating the signal of a heavy load on the conveyor belt. The above two methods are the common methods for detecting material flow on belt conveyors now, however, these methods also have the disadvantages of poor reliability and require frequent manual adjustment; in addition, the rollers are very easy to hook in the cracks when cracks appear on the conveyor belt, thereby resulting in damage to the conveyor belt and the detection device.

In a belt conveyor, the device for preventing slipping of a conveyor belt and a material flow detection device are two different protection devices, and their mechanical parts in the actual application are also different, thereby leading to the need for two different spare parts for maintenance, and greatly increasing the costs of maintenance and repair.

Summary of the Invention

The object of the present invention is to provide an anti-skid speed measurement and material flow detection device for a belt conveyor to overcome the above defects of the prior art. The device can provide better feedback on the occurrence of slipping of the conveyor belt of a belt conveyor, and can accurately measure the material flow on the conveyor belt with no need of additionally producing special parts, with the advantages of high reliability, long service life, maintenance-free, no special purchase of spare parts, etc.

The object of the present invention can be realized through the following technical solutions:

An anti-skid speed measurement and material flow detection device for a belt conveyor is provided, wherein the belt conveyor includes an intermediate frame, slotted roller supports arranged on the intermediate frame for supporting a conveyor belt, and wherein the device includes a base symmetrically arranged on the intermediate frame of the belt conveyor and arranged between two groups of slotted roller supports, sliding supports arranged on the base, a speed measurement roller and a sensor arranged on the two groups of sliding supports, and a control system connected with the sensor, a speed measurement disk is sleeved on an end face of one end of a barrel of the speed measurement roller, a circular hole is formed on the circumference of the speed measurement disk, the circular hole is arranged corresponding to the position of the sensor, when the device performs anti-skid speed measurement, the speed measurement roller is in contact with the conveyor belt, and when the device performs material flow detection, the speed measurement roller is kept at a certain distance from a bottom conveyor belt carried by the conveyor belt through the movement of the sliding supports.

The speed measurement disk is sleeved on the barrel of the speed measurement roller by means of a fastening screw and is adjacent to the end face of one end of the barrel of the speed measurement roller.

The distance between the disk surface of the speed measurement disk and the end face of one end of the barrel of the speed measurement roller is 5-10 mm.

The sliding support is provided with a through hole which is connected with the base, and a first mounting hole and a second mounting hole for mounting the speed measurement roller and the sensor, and a spindle head of the speed measurement roller is mounted in the first mounting hole.

The base is provided with a sliding support adjustment hole matching the shape of the through hole, and the length of the sliding support adjustment hole is greater than the length of the through hole.

A certain distance exists between an outer end face of an inductive head of the sensor and the surface of the speed measurement disk.

Further, the distance between the outer end face of the inductive head of the sensor and the surface of the speed measurement disk is 5-10 mm.

The sliding support adjustment hole is a strip-shaped hole.

The setting position of the second mounting hole corresponds to the setting position of the circular hole on the speed measurement disk.

The sliding support includes a vertical support and a horizontal mounting plate, the horizontal mounting plate is provided with through holes, and the vertical support is provided with a first mounting hole and a second mounting hole.

Compared with the prior art, the anti-skid speed measurement and material flow detection device for a belt conveyor provided in the present invention at least has the following beneficial effects:

(1) The device of the present invention is mounted on the intermediate frame of a belt conveyor and between two groups of slotted roller supports, and can be used not only as an anti-skid protection device for a belt conveyor, but also as a material detection device to detect whether material exists on the conveyor belt when the belt conveyor is running, one device can play two roles, and the mechanical structures of the two devices are unified, thereby significantly reducing production costs and maintenance and repair costs.

(2) The rotating piece speed measurement roller in the device of the present invention adopts a common return belt horizontal roller configured on the conveyor, so the speed measurement roller has a long service life, is easy to replace, does not need daily maintenance, and does not need special spare parts, for example, when the roller is damaged, only a roller of the same specification needs to be replaced, although the speed measurement disk rotates, the speed measurement disk is not in relative friction with other parts, so there is no abrasion, other parts are fixed once the adjustment is completed, the speed measurement roller is in contact with the lower surface of the bearing belt, and the lower surface is relatively clean, so the possibility of the speed measurement roller contacting with the material or other foreign objects is much lower than that of the lower return belt, therefore, the working reliability is higher, and the whole set of mechanical structure has the characteristics of simple structure and maintenance-free, and can effectively reduce the operating cost.

(3) The distance between the speed measurement roller and the conveyor belt can be adjusted through the moving position of the sliding support on the base, which can realize the function of detecting the slipping phenomenon or material flow by driving the speed measurement roller to rotate through the action of the conveyor belt when a small amount of material flow exists on the conveyor belt, the operation is convenient and the efficiency is high.

(4) Just through the moving position of the sliding support on the base, the function of speed measurement or detection of material flow can be realized conveniently, compared with the prior art, no great manual adjustment is required, and the amount of operation can be greatly reduced.

Reference Numerals in the Figures

Figure 1:
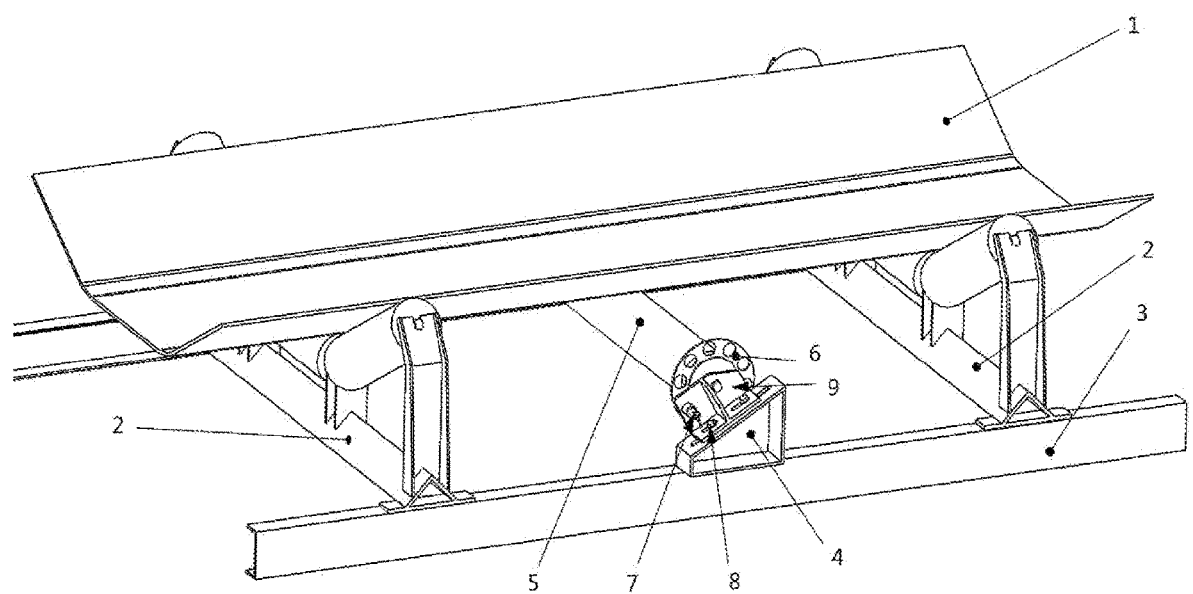
FIG. 1 is a schematic diagram of a mounting structure of the anti-skid speed measurement and material flow detection device for a belt conveyor on the belt conveyor in the embodiment.
Figure 2:
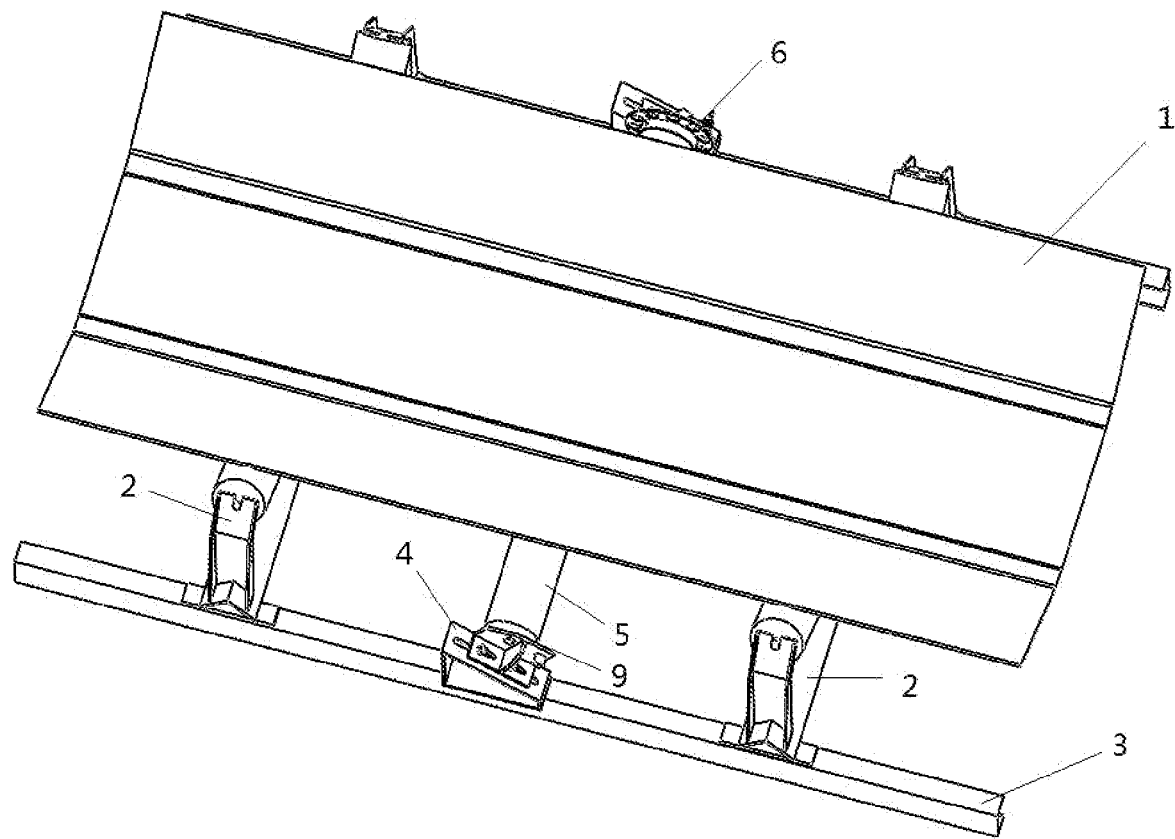
FIG. 2 is a schematic diagram of a top view of the mounting structure of the anti-skid speed measurement and material flow detection device for a belt conveyor on the belt conveyor in the embodiment.
Figure 3:
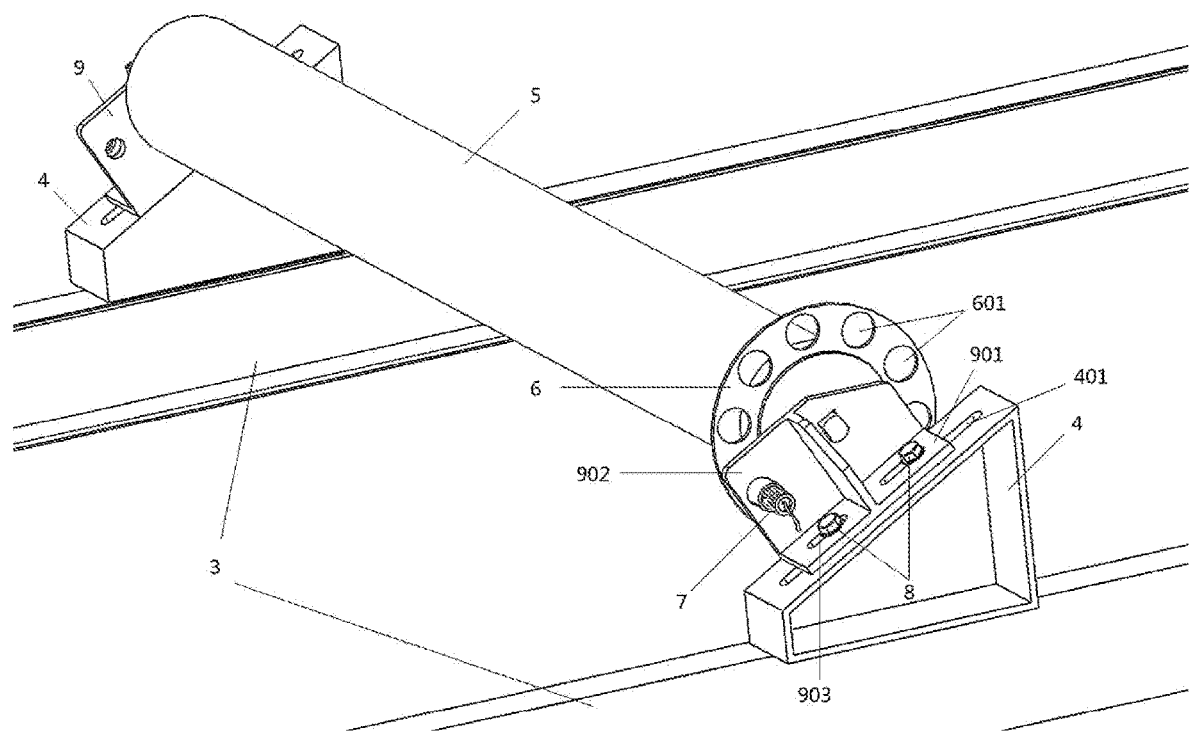
FIG. 3 is a schematic diagram of a side view of the connection relationship of the speed measurement roller, the sensor, the sliding support, and the base of the anti-skid speed measurement and material flow detection device for a belt conveyor in the embodiment.
Figure 4:
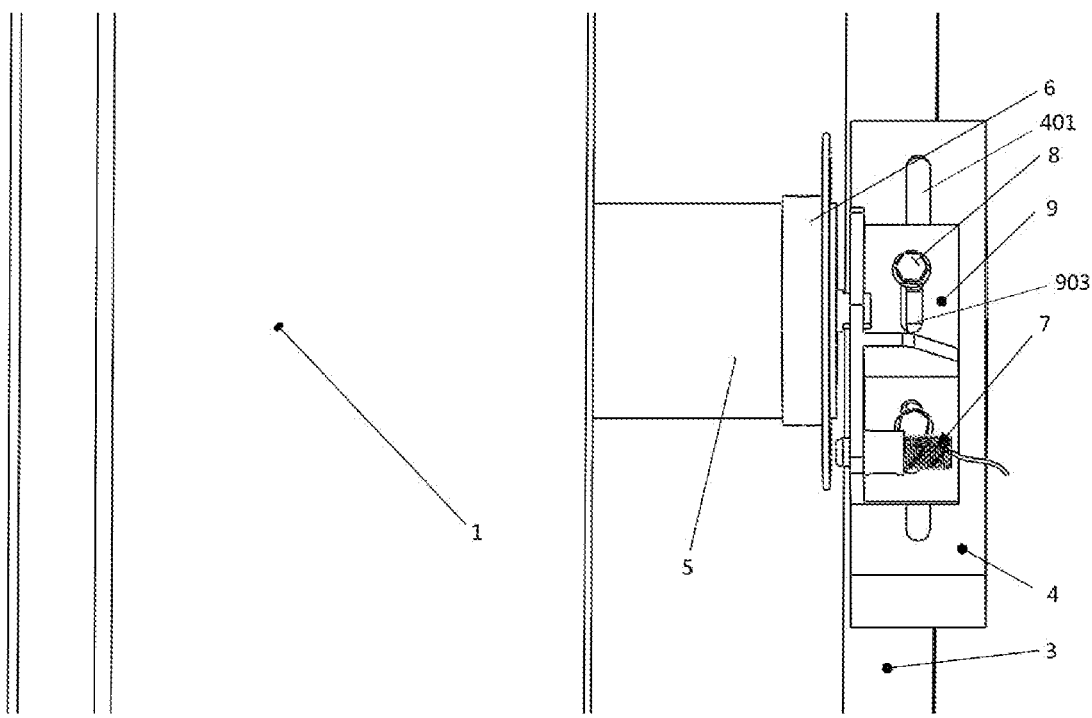
FIG. 4 is a structural schematic diagram of a top view of the connection relationship of the speed measurement roller, the sensor, the sliding support, and the base of the anti-skid speed measurement and material flow detection device for a belt conveyor in the embodiment.

1, conveyor belt, 2, slotted roller support, 3, intermediate frame, 4, base, 5, speed measurement roller, 6, speed measurement disk, 7, sensor, 8, fixed bolt, 9, sliding support, 401, sliding support adjustment hole, 601, circular hole, 901, horizontal mounting plate, 902, vertical support, 903, through hole.

DETAILED DESCRIPTION OF THE EMBODIMENTS

The present invention is described in detail below in combination with the accompanying drawings and the specific embodiment. Obviously, the described embodiment is a part but not all of the embodiments of the present invention. Based on the embodiment in the present invention, all the other embodiments obtained by those skilled in the art without any creative effort shall all fall within the protection scope of the present invention.

Embodiment

The present invention relates to an anti-skid speed measurement and material flow detection device for a belt conveyor, the device is mounted on an intermediate frame 3 of a belt conveyor, and after the speed measurement roller 5 is in contact with the bottom surface of an upper tape of the conveyor belt 1, the device is driven to rotate under the friction force of the conveyor belt 1, to feed back the rotating signal.

The device includes a speed measurement roller 5, a speed measurement disk 6, a sliding support 9, a base 4, a sensor 7 and a control system. The sliding support 9 is arranged on the base 4, and the base 4 is symmetrically arranged on the intermediate frame 3 at two sides of the belt conveyor and is arranged between two groups of slotted roller supports 2. The speed measurement roller 5 used in the device is a horizontal roller of the same specification and model already on the belt conveyor. The speed measurement roller 5 is mounted on the sliding support 9, and a spindle head of the speed measurement roller 5 is inserted into the corresponding hole on the sliding support 9. The sensor 7 is also mounted on the sliding support 9. The sensor 7 is connected with the control system, and the control system is configured to acquire the inductive signal of the sensor 7.

The speed measurement disk 6 is a disc-type structure with a circular through hole in the center, and the diameter of the circular through hole is the same as the outer diameter dimension of the speed measurement roller 5, the speed measurement roller 5 penetrates through the circular through hole, the speed measurement disk 6 is sleeved and fixed on the barrel of the speed measurement roller 5 by fastening screws, and is adjacent to the end face of the barrel of the speed measurement roller 5, and the distance between the disc surface of the speed measurement disk 6 and the barrel end face of the speed measurement roller 5 is 5-10 mm. The speed measurement disk 6 can rotate along with the rotation of the speed measurement roller 5, but will not slip in any direction. A plurality of circular holes 601 of the same size are arranged on the circumference of the speed measurement disk 6 at equal intervals. The sensor 7 is mounted on the sliding support 9, and the distance between the outer end face of the inductive head of the sensor 7 and the surface of the speed measurement disk 6 is ensured to be 5-10 mm. The sliding support 9 is provided with a through hole connected with the base 4 and mounting holes for mounting the sensor 7 and the speed measurement roller 5. Specifically, the sliding support 9 is an L-shaped support structure and includes a vertical support 902 and a horizontal mounting plate 901, and the horizontal mounting plate 901 is provided with a through hole 903, and the through hole 903 is a strip-shaped hole; the upper end face of the base 4 is provided with a sliding support adjustment hole 401, and the hole is a strip-shaped hole with the shape matching the shape of the through hole 903 and a length greater than the length of the through hole 903, and the two are securely connected by a fixing bolt 8. The vertical support 902 is provided with a first mounting hole and a second mounting hole, and the first mounting hole is used to mount the spindle head of the speed measurement roller 5, and the size and shape of the hole match the size and shape of the speed measurement roller 5. The second mounting hole is used for mounting the sensor 7, and the size and shape of the hole are adapted to the sensor 7. The setting position of the second mounting hole corresponds to the setting position of the circular hole 601 on the speed measurement disk 6, i.e., the setting height of the second mounting hole is set to correspond to the circular hole 601 on the speed measurement disk 6.

In the present embodiment, the sensors 7 are various types of non-contact proximity limit (proximity sensors), the return difference, response time, detection frequency, and repetition precision of the proximity limit can match the number, diameter, and maximum rotating speed of the holes on the speed measurement disk 6, the type of the selected proximity limit matches the material and exterior color of the speed measurement disk 6, and the output electrical signal can satisfy the input requirement of the control system of the belt conveyor.

In the present embodiment, as a preferred solution, the control system adopts a computer.

In the present embodiment, as a preferred solution, the base 4 is a frame base structure with the top surface being inclined, the sliding support adjustment hole 401 is arranged on the inclined surface in a penetrating manner, and the sliding support 9 is vertically arranged on the inclined surface through the cooperative relationship of the sliding support adjustment hole 401, the through hole 903, and the fixing bolt 8. The speed measurement roller 5 is fixed onto the sliding support 9 through a first mounting hole, and the sensor 7 is fixed onto the sliding support 9 through a second mounting hole. When the sliding support 9 moves above the inclined surface of the base 4, the speed measurement roller 5 is also driven to move upwards, so that it is closer to the distance with the bottom surface of the conveyor belt 1. In other words, through the moving position of the sliding support 9 on the inclined surface, the distance between the speed measurement roller 5 and the conveyor belt 1 can be adjusted, to realize the function that when a small amount of material flow exists on the conveyor belt 1, the speed measurement roller 5 can be driven to rotate under the action of the conveyor belt 1 to detect slipping phenomenon or material flow. In addition, according to the design, only by the moving position of the sliding support 9 on the inclined surface, the function of speed measurement or detection of material flow can be conveniently achieved, the operation is easy and the efficiency is high, compared with the prior art, no great manual adjustment is required and the amount of operation can be greatly reduced.

The anti-skid speed measurement and material flow detection device for a belt conveyor of the present invention can realize two different detection and protection effects through different mounting methods:

The first application method: the device can be used as an anti-skid device for a conveyor belt. The device is mounted on the intermediate frame 3 of the belt conveyor, the intermediate frame 3 is provided with slotted roller supports 2 for supporting the conveyor belt 1. The device of the present invention is mounted between the two slotted roller supports 2.

Specifically, the sliding support 9 is mounted on a base 4, the base 4 is arranged on the intermediate frame 3, and is arranged between two slotted roller supports 2. The speed measurement roller 5 is in contact with the bottom conveyor belt carried by the conveyor belt 1 through the sliding support 9, no matter in an unloaded state or a heavily-loaded state, the conveyor belt 1 is always in contact with the speed measurement roller 5, thereby ensuring that the conveyor belt 1 can drive the speed measurement roller 5 to rotate when the conveyor belt 1 runs. At this time, the speed measurement roller 5 mounted on the sliding support 9 can drive the speed measurement disk 6 to rotate, circular holes 601 are arranged on the circumference of the speed measurement disk 6, and the position of the circular hole 601 just corresponds to the sensor 7, when the speed measurement disk 6 rotates, the sensor 7 cannot detect signals at the position of the circular hole 601 of the speed measurement disk 6, and signals can only be detected at the position other than the circular hole 601; along with the continuous rotation of the speed measurement disk 6, the sensor 7 can generate continuous pulse signals and output to a control system, the control system determines the rotating speed of the speed measurement roller 5 according to the quantity of pulses, to determine the running speed of the conveyor belt 1. When the measured speed is not consistent with the numerical value specified by the conveyor belt 1, the conveyor belt 1 is determined to be abnormal, for example, when slipping occurs, it indicates that the belt conveyor is in fault and needs to stop for processing.

The second application method: the device can be used as a material flow detection device for a belt conveyor. The device is mounted on the intermediate frame 3 of the belt conveyor, the intermediate frame 3 is provided with slotted roller supports 2 for supporting the conveyor belt 1. The device of the present invention is mounted between the two slotted roller supports 2.

Specifically, the sliding support 9 is mounted on a base 4, the base 4 is arranged on the intermediate frame 3, and is arranged between two slotted roller supports 2. The sliding support 9 is mounted on the base 4, a certain distance is kept between the speed measurement roller 5 and the bottom conveyor belt carried by the conveyor belt 1 through the sliding support 9, and the distance serves as a basis for judging the existence of materials when the minimum quantity of materials appear on the conveyor belt 1, therefore, the distance can be adjusted according to different requirements of users, and the commonly used distance is set to be (10 mm-50 mm). After materials appear on the conveyor belt 1, the conveyor belt 1 will sink downwards under the effect of the material gravity, at this time, the conveyor belt 1 will be in contact with the speed measurement roller 5, and the running conveyor belt 1 will enable the speed measurement roller 5 to rotate, at this time, the speed measurement roller 5 mounted on the sliding support 9 will drive the speed measurement disk 6 to rotate, circular holes 601 are arranged on the circumference of the speed measurement disk 6, the position of the circular hole 601 just corresponds to the sensor 7, when the speed measurement disk 6 rotates, the sensor 7 cannot detect signals at the position of the circular hole 601 of the speed measurement disk 6, and signals can only be detected at the position other than the circular hole 601. Along with the continuous rotation of the speed measurement disk 6, the sensor 7 can generate continuous pulse signals and output to the control system, to determine that material flows pass by the conveyor belt 1, when the conveyor belt 1 returns to be unloaded, the conveyor belt 1 will be separated from the speed measurement roller 5, and the speed measurement roller 5 stops running after losing a driving force, at this time, the sensor 7 no longer outputs signals, and since no signal can be obtained, the control system determines that the belt conveyor is in an unloaded running state.

The above is merely a specific implementation of the present invention, but the protection scope of the present invention is not limited hereto, and those skilled in the art can easily conceive of various equivalent modifications or substitutions within the technical scope disclosed by the present invention, and these modifications or substitutions shall all fall within the protection scope of the present invention. Therefore, the protection scope of the present invention shall all fall within the protection scope of the claims.

We claim:

1. An anti-skid speed measurement and material flow detection device for a belt conveyor, wherein the belt conveyor comprises an intermediate frame (3), slotted roller supports (2) arranged on the intermediate frame (3) for supporting a conveyor belt (1), and wherein the device comprises a base (4) symmetrically arranged on the intermediate frame (3) of the belt conveyor and arranged between two groups of slotted roller supports (2), sliding supports (9) arranged on the base (4), a speed measurement roller (5) and a sensor (7) arranged on the two groups of sliding supports (9), and a control system connected with the sensor (7), a speed measurement disk (6) is sleeved on an end face of one end of a barrel of the speed measurement roller (5), a circular hole (601) is formed on the circumference of the speed measurement disk (6), the circular hole (601) is arranged corresponding to a position of the sensor (7), when the device performs anti-skid speed measurement, the speed measurement roller (5) is in contact with the conveyor belt (1), and when the device performs material flow detection, the speed measurement roller (5) is kept at a certain distance from a bottom conveyor belt carried by the conveyor belt (1) through the movement of the sliding supports (9).

2. The anti-skid speed measurement and material flow detection device for a belt conveyor of claim 1, wherein the speed measurement disk (6) is sleeved on the barrel of the speed measurement roller (5) by means of a fastening screw and is adjacent to the end face of one end of the barrel of the speed measurement roller (5).

3. The anti-skid speed measurement and material flow detection device for a belt conveyor of claim 2, wherein the distance between the disk surface of the speed measurement disk (6) and the end face of one end of the barrel of the speed measurement roller (5) is 5-10 mm.

4. The anti-skid speed measurement and material flow detection device for a belt conveyor of claim 1, wherein the sliding support (9) is provided with a through hole (903) which is connected with the base (4), and a first mounting hole and a second mounting hole for mounting the speed measurement roller (5) and the sensor (7), and a spindle head of the speed measurement roller (5) is mounted in the first mounting hole.

5. The anti-skid speed measurement and material flow detection device for a belt conveyor of claim 4, wherein the base (4) is provided with a sliding support adjustment hole (401) matching the shape of the through hole (903), and the length of the sliding support adjustment hole is greater than the length of the through hole (903).

6. The anti-skid speed measurement and material flow detection device for a belt conveyor of claim 1, wherein a certain distance exists between an outer end face of an inductive head of the sensor (7) and the surface of the speed measurement disk (6).

7. The anti-skid speed measurement and material flow detection device for a belt conveyor of claim 6, wherein the distance between the outer end face of the inductive head of the sensor (7) and the surface of the speed measurement disk (6) is 5-10 mm.

8. The anti-skid speed measurement and material flow detection device for a belt conveyor of claim 5, wherein the sliding support adjustment hole (401) is a strip-shaped hole.

9. The anti-skid speed measurement and material flow detection device for a belt conveyor of claim 4, wherein the setting position of the second mounting hole corresponds to the setting position of the circular hole (601) on the speed measurement disk (6).

10. The anti-skid speed measurement and material flow detection device for a belt conveyor of claim 9, wherein the sliding support (9) comprises a vertical support (902) and a horizontal mounting plate (901), the horizontal mounting plate (901) is provided with through holes (903), and the vertical support (902) is provided with a first mounting hole and a second mounting hole.

* * * * *